United States Patent
Zhang et al.

(10) Patent No.: US 11,178,220 B2
(45) Date of Patent: Nov. 16, 2021

(54) METHOD AND SYSTEM FOR TRANSMITTING A DATA RESOURCE ACQUISITION REQUEST

(71) Applicant: WANGSU SCIENCE & TECHNOLOGY CO., LTD., Shanghai (CN)

(72) Inventors: Yu Zhang, Shanghai (CN); Shujia Dong, Shanghai (CN)

(73) Assignee: WANGSU SCIENCE & TECHNOLOGY CO., LTD., Shanghai (CN)

( * ) Notice: Subject to any disclaimer, the term of this patent is extended or adjusted under 35 U.S.C. 154(b) by 700 days.

(21) Appl. No.: 16/073,549

(22) PCT Filed: Feb. 28, 2018

(86) PCT No.: PCT/CN2018/077556
§ 371 (c)(1),
(2) Date: Jul. 27, 2018

(87) PCT Pub. No.: WO2019/148569
PCT Pub. Date: Aug. 8, 2019

(65) Prior Publication Data
US 2021/0211490 A1  Jul. 8, 2021

(30) Foreign Application Priority Data
Feb. 2, 2018 (CN) .......................... 201810106136.9

(51) Int. Cl.
*H04L 29/08* (2006.01)
*H04L 12/819* (2013.01)

(52) U.S. Cl.
CPC .......... *H04L 67/101* (2013.01); *H04L 47/215* (2013.01)

(58) Field of Classification Search
CPC .......................... H04L 67/101; H04L 47/215
See application file for complete search history.

(56) References Cited

U.S. PATENT DOCUMENTS

2006/0106938 A1  5/2006  Dini et al.
2008/0215718 A1  9/2008  Stolorz et al.
(Continued)

FOREIGN PATENT DOCUMENTS

| CN | 1575582 A | 2/2005 |
|---|---|---|
| CN | 101674247 A | 3/2010 |

(Continued)

OTHER PUBLICATIONS

The China National Intelleectual Property Administration (CNIPA) the China Search Report for 201810106136.9, Nov. 27, 2019 5 Pages.
(Continued)

*Primary Examiner* — Duc C Ho (57) ABSTRACT

A method for transmitting a data resource acquisition request includes: when transmitting an acquisition request for a first data resource, obtaining, by a first node, locally-stored traffic scheduling policies of a plurality of secondary nodes associated with a resource server to which the first data resource belongs, wherein the traffic scheduling policies are generated by each of the plurality of secondary nodes based on a local traffic load status; selecting, by the first node, a target node among the plurality of secondary nodes based on the traffic scheduling policies of the plurality of secondary nodes; and transmitting, by the first node, the acquisition request for the first data resource to the target node.

14 Claims, 3 Drawing Sheets

When there is a necessity to transmit an acquisition request for a first data resource, the first node obtains locally-stored traffic scheduling policies of a plurality of secondary nodes associated with a resource serve to which the first data resource belongs — 201

The first node selects a target node among the plurality of secondary nodes based on the traffic scheduling policies of the plurality of secondary nodes — 202

The first node transmits the acquisition request for the first data resource to the target node — 203

(56) References Cited

U.S. PATENT DOCUMENTS

| | | | | |
|---|---|---|---|---|
| 2010/0223364 | A1* | 9/2010 | Wei | H04L 61/1511 709/220 |
| 2012/0120798 | A1 | 5/2012 | Jacquet et al. | |
| 2013/0041982 | A1* | 2/2013 | Shi | H04L 67/1089 709/217 |
| 2014/0337472 | A1* | 11/2014 | Newton | H04L 41/509 709/217 |
| 2014/0355542 | A1* | 12/2014 | Zhang | H04W 4/029 370/329 |
| 2015/0058403 | A1* | 2/2015 | He | H04L 67/1021 709/203 |
| 2017/0171610 | A1* | 6/2017 | Nair | H04N 21/23476 |

FOREIGN PATENT DOCUMENTS

| | | |
|---|---|---|
| CN | 102082693 A | 6/2011 |
| CN | 102498696 A | 6/2012 |
| CN | 107222560 A | 9/2017 |
| CN | 107613030 A | 1/2018 |

OTHER PUBLICATIONS

The European Patent Office (EPO) the Extended European Search Report for 18769023.5 Aug. 9, 2019 13 Pages.

* cited by examiner

METHOD AND SYSTEM FOR TRANSMITTING A DATA RESOURCE ACQUISITION REQUEST

CROSS-REFERENCES TO RELATED APPLICATIONS

This application is a national phase entry under 35 U.S.C § 371 of International Application No. PCT/CN2018/077556 filed on Feb. 28, 2018, which claims priority of Chinese Patent Application No. 2018101061369, filed with the State Intellectual Property Office of P. R. China on Feb. 2, 2018, the entire contents of all of which are incorporated herein by reference.

FIELD OF THE DISCLOSURE

The present disclosure generally relates to the field of data transmission technology and, more particularly, relates to a method and system for transmitting a data resource acquisition request.

BACKGROUND

With the continuous advancement of Internet technology, CDN (Content Delivery Network) services have also developed rapidly. The CDN service cluster includes a large number of node servers for storing data resources and accelerating network services. The node servers may include edge node servers (may be simply referred to as "edge nodes") and parent node servers (may be simply referred to as a "parent nodes" and may include dynamic parent nodes and static parent nodes).

When a user wants to acquire a certain data resource, the user may transmit an acquisition request for the data resource to the CDN service cluster through a terminal, to allow an edge node in the CDN service cluster to receive the acquisition request. If the data resource is not stored locally, the edge node may select an optimal path for back-to-source processing to obtain the data resource, that is, send the data resource acquisition request to an associated server through dynamic parent node(s) on the optimal path.

In the process of implementing the present disclosure, the inventors have found that the existing technologies have at least the following problems:

If there are a large number of back-to-source requests for the data resources in the edge node(s) at a certain moment, and the corresponding optimal paths pass through the same dynamic parent node, the dynamic parent node will need to forward a large number of data resource acquisition requests at the same time. This will lead to a decreased back-to-source efficiency in the dynamic parent node due to the continuous traffic overload, and thus a reduced quality of the back-to-source acceleration service in the CDN service cluster.

BRIEF SUMMARY OF THE DISCLOSURE

To solve the above problems of the existing technologies, a method and system for transmitting a data resource acquisition request are provided in the disclosed embodiments of the present disclosure. The technical solutions may be as follows:

In a first aspect, a method for transmitting a data resource acquisition request is provided. The method includes:

when transmitting an acquisition request for a first data resource, obtaining, by a first node, locally-stored traffic scheduling policies of a plurality of secondary nodes associated with a resource server to which the first data resource belongs, where the traffic scheduling policies are generated by each of the plurality of secondary nodes based on a local traffic load status;

selecting, by the first node, a target node among the plurality of secondary nodes based on the traffic scheduling policies of the plurality of secondary nodes; and transmitting, by the first node, the acquisition request for the first data resource to the target node.

Optionally, the method further includes:

configuring, by a second node, an RFC 2697 token bucket algorithm based on a regular load upper limit of local traffic;

periodically obtaining, by the second node, historical total local traffic in historical cycles, and predicting, by the second node, a latest total local traffic in a current cycle; and determining, by the second node, a traffic scheduling policy of the second node based on the latest total local traffic and execution parameters of the RFC 2697 token bucket algorithm.

Optionally, the determining, by the second node, the traffic scheduling policy of the second node based on the latest total local traffic and the execution parameters of the RFC 2697 token bucket algorithm includes:

determining, by the second node, a number of total available tokens of a committed bucket in the current cycle based on a number of current tokens and a token adding rate of the committed bucket and a number of current tokens and a token adding rate of an excess bucket of the RFC 2697 token bucket algorithm;

if the number of total available tokens is negative, determining, by the second node, that the traffic scheduling policy of the second node is full traffic-split;

if the number of total available tokens is positive and less than the latest total local traffic, determining, by the second node, that the traffic scheduling policy of the second node is partial traffic-split; and if the number of total available tokens is positive and not less than the latest total local traffic, determining, by the second node, that the traffic scheduling policy of the second node is no traffic-split.

Optionally, the method further includes:

periodically sending, by the first node, a probe request to each of the plurality of secondary nodes;

receiving, by the first node, a probe response fed back by each of the plurality of secondary nodes, and determining, by the first node, a network delay between the first node and each of the plurality of secondary nodes; and determining, by the first node, a priority of each of the plurality of secondary nodes based on the network delay, where the smaller the network delay, the higher the priority of a secondary node.

Optionally, the selecting, by the first node, the target node among the plurality of secondary nodes based on the traffic scheduling policies of the plurality of secondary nodes includes:

sequentially selecting, by the first node, a candidate node among the plurality of secondary nodes in a descending order of priority; and when a traffic scheduling policy of the candidate node is partial traffic-split and the acquisition request for the first data resource does not satisfy preset criteria for traffic splitting, or when the traffic scheduling policy of the candidate node is no traffic-split, determining, by the first node, that the candidate node is the target node.

Optionally, the probe response fed back by each of the plurality of secondary nodes includes a traffic scheduling policy of that secondary node, and after receiving, by the first node, the probe response fed back by each of the plurality of secondary nodes, the method further includes:

updating, by the first node, a locally-stored traffic scheduling policy of each of the plurality of secondary nodes based on the traffic scheduling policy included in the probe response.

Optionally, the method further includes:

receiving, by the first node, a request response for a second data resource sent by a third node; and updating, by the first node, a locally-stored traffic scheduling policy of the third node based on a traffic scheduling policy of the third node included in the request response.

In a second aspect, a system for transmitting a data resource acquisition request is provided. The system comprises a plurality of nodes, where the plurality of nodes includes a first node that is configured to:

when transmitting an acquisition request for a first data resource, obtain locally-stored traffic scheduling policies of a plurality of secondary nodes associated with a resource server to which the first data resource belongs, where the traffic scheduling policies are generated by each of the plurality of secondary nodes based on a local traffic load status;

select a target node among the plurality of secondary nodes based on the traffic scheduling policies of the plurality of secondary nodes; and transmit the acquisition request for the first data resource to the target node.

Optionally, the plurality of nodes further includes a second node. The second node is configured to:

configure an RFC 2697 token bucket algorithm based on a regular load upper limit of local traffic;

periodically obtain historical total local traffic in historical cycles, and predict a latest total local traffic in a current cycle; and determine a traffic scheduling policy of the second node based on the latest total local traffic and execution parameters of the RFC 2697 token bucket algorithm.

Optionally, the second node is specifically configured to:

determine a number of total available tokens of a committed bucket in the current cycle based on a number of current tokens and a token adding rate of the committed bucket and a number of current tokens and a token adding rate of an excess bucket of the RFC 2697 token bucket algorithm;

if the number of total available tokens is negative, determine that the traffic scheduling policy of the second node is full traffic-split;

if the number of total available tokens is positive and less than the latest total local traffic, determine that the traffic scheduling policy of the second node is partial traffic-split; and if the number of total available tokens is positive and not less than the latest total local traffic, determine that the traffic scheduling policy of the second node is no traffic-split.

Optionally, the first node is further configured to:

periodically send a probe request to each of the plurality of secondary nodes;

receive a probe response fed back by each of the plurality of secondary nodes, and determine a network delay between the first node and each of the plurality of secondary nodes; and determine a priority of each of the plurality of secondary nodes based on the network delay, where the smaller the network delay, the higher the priority of a secondary node.

Optionally, the first node is specifically configured to:

select a candidate node among the plurality of secondary nodes in a descending order of priority; and when a traffic scheduling policy of the candidate node is partial traffic-split and the acquisition request for the first data resource does not satisfy preset criteria for traffic splitting, or when the traffic scheduling policy of the candidate node is no traffic-split, determine that the candidate node is the target node.

Optionally, the probe response fed back by each of the plurality of secondary nodes includes a traffic scheduling policy of that secondary node, and the first node is further configured to:

update a locally-stored traffic scheduling policy of each of the plurality of secondary nodes based on the traffic scheduling policy included in the probe response.

Optionally, the plurality of nodes further includes a third node, where the first node is further configured to:

receive a request response for a second data resource sent by a third node; and update a locally-stored traffic scheduling policy of the third node based on a traffic scheduling policy of the third node included in the request response.

Beneficial effects brought about by the technical solutions of the disclosed embodiments of the present disclosure include:

In the disclosed embodiments, when there is a necessity to transmit the acquisition request for the first data resource, the first node obtains locally-stored traffic scheduling policies of a plurality of secondary nodes associated with the resource server to which the first data resource belongs, where the traffic scheduling policies are generated by each of the plurality of secondary nodes based on a local traffic load status; the first node selects a target node among the plurality of secondary nodes based on the traffic scheduling policies of the plurality of secondary nodes; and the first node transmits the acquisition request for the first data resource to the target node. In this way, when transmitting a data resource acquisition request, each node may transmit the aforementioned acquisition request to a secondary node that is not overloaded in traffic based on the traffic scheduling policies of the secondary nodes. This effectively mitigates the reduced back-to-source efficiency of a dynamic parent node caused by the continuous traffic overload, thereby improving the quality of the back-to-source acceleration service in the CDN service cluster.

BRIEF DESCRIPTION OF THE DRAWINGS

To make the technical solutions in the embodiments of the present disclosure clearer, a brief introduction of the accompanying drawings consistent with descriptions of the embodiments will be provided hereinafter. It is to be understood that the following described drawings are merely some embodiments of the present disclosure. Based on the accompanying drawings and without creative efforts, persons of ordinary skill in the art may derive other drawings.

DETAILED DESCRIPTION

To make the objectives, technical solutions, and advantages of the present disclosure clearer, specific embodiments of the present disclosure will be made in detail with reference to the accompanying drawings.

Figure 1:
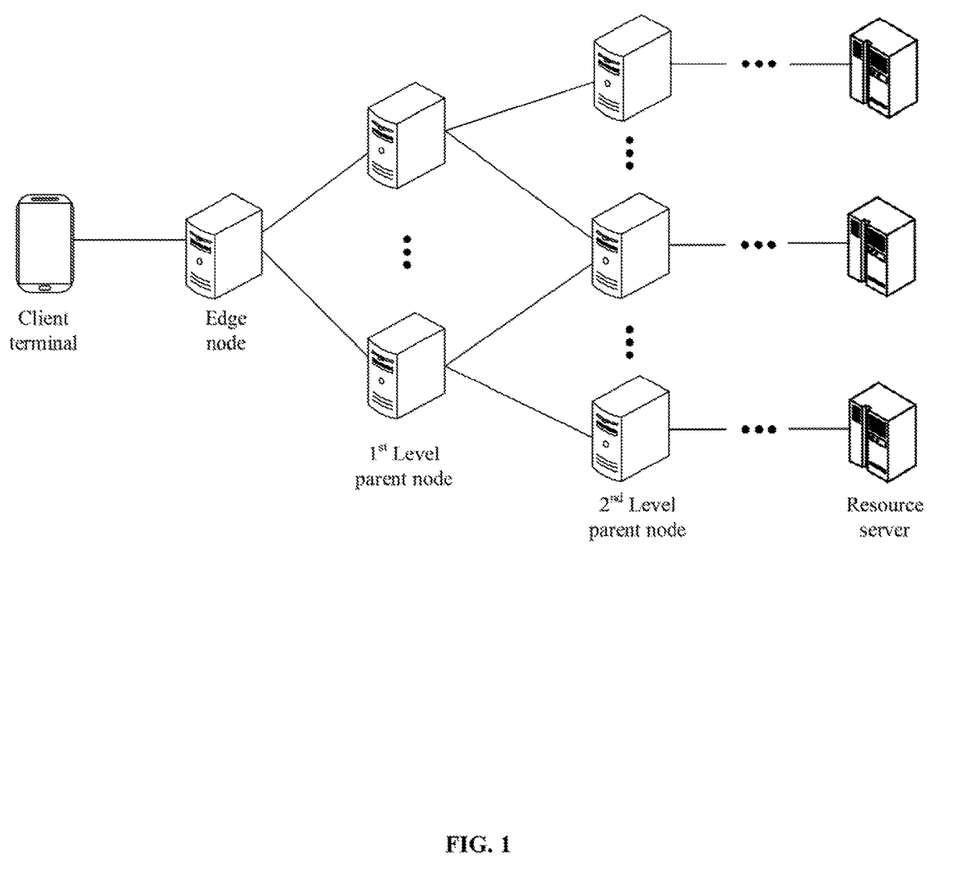
FIG. 1 is a schematic diagram of a network architecture of a CDN service cluster according to some embodiments of the present disclosure.

A method for transmitting a data resource acquisition request is provided in the disclosed embodiment of the present disclosure. The method may be cooperatively executed by a plurality of node servers in a CDN service cluster. The network architecture may be as shown in FIG. 1. The plurality of node servers may include edge node server(s) (may be referred to as "edge node(s)" hereinafter) and multi-level parent node servers (may be referred to as "parent nodes" hereinafter). Here, the edge node(s) is(are) receiving node(s) for user requests in the CDN service cluster, and parent nodes are nodes that are located after the edge node(s) according to the deployment layers/levels of the CDN service cluster. The parent nodes include static parent nodes for caching the data resources and dynamic parent nodes for providing the back-to-source acceleration service. In the disclosed embodiments, the static parent nodes will not be covered in the nodes described hereinafter. In the disclosed embodiments, all nodes refer to the node servers in the CDN service cluster, but do not include terminals and resource servers. The aforementioned node server may include a processor, a memory, and a transceiver. The processor may be configured to process the transmission of data resource acquisition requests as described elsewhere herein. The memory may store data required and generated in the following processes. The transceiver may be configured to receive and transmit the data involved in the following processes. In certain situations, the function of a node server may be implemented by a server group comprising a plurality of servers. A node server is described in the disclosed embodiments by reference to a single server, but node servers under other situations will act similarly to those described for a single server, which will not be described again.

Figure 2:
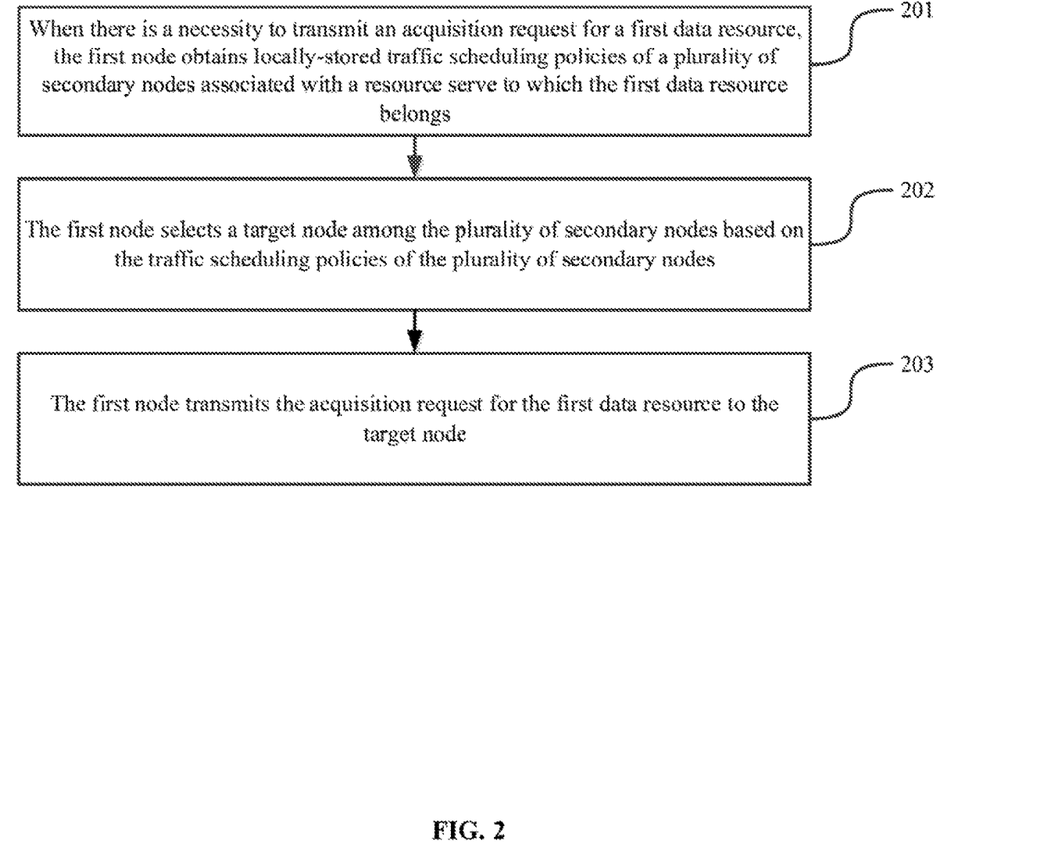
FIG. 2 is a flowchart of a method for transmitting a data resource acquisition request according to some embodiments of the present disclosure.

Specific embodiments of the present disclosure will be made in detail with reference to the processing procedure shown in FIG. 2, which may be as follows:

Step 201: when transmitting an acquisition request for a first data resource, a first node obtains locally-stored traffic scheduling policies of a plurality of secondary nodes associated with a resource server to which the first data resource belongs.

Here, the first node may be any node of all of the edge node(s) and the dynamic parent nodes that have secondary nodes.

In one implementation, when providing the back-to-source acceleration service, a dynamic parent node may generate a traffic scheduling policy based on its local traffic load status, and feed back the traffic scheduling policy to a higher level node in a predefined manner. After obtaining the traffic scheduling policy of the dynamic parent node, the higher level node may store the obtained policy in the local, so as to select the transmission path based on the traffic scheduling policy when transmitting a data resource acquisition request. Here, when the first node is an edge node, after the first node receives a user's acquisition request for a data resource (e.g., a first data resource), if the first data resource is not stored in the local, the first node needs to transmit the corresponding acquisition request through other nodes to a resource server to which the first data resource belongs. The first node may first determine a plurality of secondary nodes associated with the resource server to which the first data resource belongs, and obtain the locally-stored traffic scheduling policies of the plurality of secondary nodes. When the first node is a dynamic parent node, after receiving the acquisition request for the first data resource sent by a higher level node, the first node needs to transmit the acquisition request through other nodes to the resource server to which the first data resource belongs. The first node may first determine the plurality of secondary nodes associated with the resource server to which the first data resource belongs, and obtain the locally-stored traffic scheduling policies of a plurality of secondary nodes. It is to be understood that for each resource server, the technical staff of the CDN service cluster may configure corresponding secondary nodes associated with the resource server in each edge node and dynamic parent nodes. That is, the present node may transmit the data resource acquisition request to the resource server through any of these secondary nodes.

Step 202: the first node selects a target node among the plurality of secondary nodes based on the traffic scheduling policies of the plurality of secondary nodes.

In one implementation, after obtaining the traffic scheduling policies of the plurality of secondary nodes, the first node may select, based on the traffic scheduling policies, a target node among the plurality of secondary nodes for transmitting the acquisition request for the first data resource.

Step 203: the first node transmits the acquisition request for the first data resource to the target node.

In one implementation, after selecting the target node, the first node may transmit the acquisition request for the first data resource to the target node.

Optionally, a dynamic parent node may use an RFC 2697 token bucket to determine the traffic scheduling policy. The corresponding process may be as follows: a second node configures the RFC 2697 token bucket based on the regular load upper limit of the local traffic; the second node periodically obtains the historical total local traffic in the history cycles, and predicts the latest total local traffic in the current cycle; and the second node determines the traffic scheduling policy of the second node based on the latest total local traffic and execution parameters of the RFC 2697 token bucket algorithm.

Here, the second node may be any of the dynamic parent nodes for providing the back-to-source acceleration service, or may be any secondary node of any node in the CDN service cluster. The execution parameters of the RFC 2697 token bucket algorithm include the token adding rate and the token bucket capacities.

In one implementation, a configuration server may be also provided in the CDN service cluster. The configuration server may determine the maximum allowed traffic (i.e., the regular load upper limit of the local traffic) on each dynamic parent node under normal situations based on the device specifications of different dynamic parent nodes, such as the number of CPUs and CPU frequencies, the number of memories, the bandwidth of the network adapter, disk type and revolutions per minute of a disk. Apparently, the aforementioned regular load upper limit may be also autonomously generated by a dynamic parent node. Taking the second node as an example, after obtaining the regular load upper limit of the local traffic, the second node may configure the RFC 2697 token bucket algorithm, that is, configure the execution parameters of the RFC 2697 token bucket algorithm, based on the regular load upper limit. It should be noted that the RFC 2697 token bucket algorithm includes two token buckets: a committed bucket (may be referred to as "C bucket") and an excess bucket (may be referred to as "E bucket"). A token bucket may be considered as a container for storing a certain number of tokens. A device may add tokens first to the C bucket based on the configured token adding rate. After the tokens in the C bucket are full, the device may continue to add tokens to the E bucket at the same token adding rate. Traffic transmitted to the token buckets preferentially drains the tokens in the C bucket. The number of tokens drained by the traffic of different volumes is different. During the traffic peaks, if all the tokens in the C bucket are insufficient to meet the current to-be-transmitted traffic, the tokens in the E bucket may continue to be drained in a manner of indebtedness. In the low-traffic periods, the tokens in the E bucket may be preferentially filled to the full in a manner of repayment, and then the tokens may be added to the C bucket. Therefore, the second node may set the token adding rate as the regular load upper limit, and set the capacities of the C bucket and the E bucket as the product of the token adding rate and the cycle time-length. For example, if the regular load upper limit is 100 M/s and the cycle time-length is 1 min, then the capacities of the C bucket and the E bucket are both 6000 M. If a token is equivalent to 1 M, then the token adding rate is 100/s.

A traffic server may be also configured in the CDN service cluster. The traffic server is configured to record the actual traffic load status of each dynamic parent node. When providing the back-to-source acceleration service, a dynamic parent node needs to periodically update its traffic scheduling policy. Taking the second node as an example, after configuring the RFC 2697 token bucket algorithm, the second node may periodically obtain the historical total local traffic in the historical cycles from the traffic server, and predict the latest total local traffic in the current cycle based on the data. Specifically, the least square fitting method or other feasible prediction algorithms may be used here. A second node may determine the traffic scheduling policy of the second node in the current cycle based on the predicted latest total local traffic and the execution parameters of the RFC 2697 token bucket algorithm.

Optionally, the traffic scheduling policy may be categorized into full traffic-split, partial traffic-split, and no traffic-split. Correspondingly, the process of determining the traffic scheduling policy may be as follows: based on the current token numbers and the token adding rate of the committed bucket and the excess bucket of the RFC 2697 token bucket algorithm, the second node determines the number of total available tokens in the committed bucket in the current cycle. If the number of total available tokens is negative, the traffic scheduling policy is determined to be full traffic-split. If the number of total available tokens is positive and less than the latest total local traffic, the traffic scheduling policy is determined to be partial traffic-split. If the number of total available tokens is positive and not less than the latest total local traffic, the traffic scheduling policy is determined to be no traffic-split.

In one implementation, during the process of generating the traffic scheduling policy, the second node may first determine the current number of tokens of the C bucket and the E bucket of the RFC 2697 token bucket algorithm, and then calculate the number of total available tokens of the C bucket in the current cycle based on the token adding rate. That is, the number of total available tokens in the C bucket equals to the number of current tokens in the C bucket plus the number of total tokens that may be added in the current cycle. It should be noted that if the token in the E bucket is not full, it means that the second node is in debt. At this moment, the number of current tokens in the C bucket may be expressed as a negative number. Further, if the number of total available tokens is negative, it means that even if there is no traffic load in the current cycle, the second node will still be in debt. This indicates that the second node is completely overloaded. It may then be determined that the traffic scheduling policy is full traffic-split. If the number of total available tokens is positive and less than the latest total local traffic, it means that the number of total available tokens in the current cycle is not enough to carry all the traffic. This indicates that the second node is partially overloaded. It may then be determined that the traffic scheduling policy is partial traffic-split. If the available number of total tokens is positive and not less than the latest total local traffic, it means that the number of total available tokens in the current cycle is enough to carry all the traffic. This indicates that the second node is not overloaded. It may then be determined that the traffic scheduling policy is no traffic-split.

Optionally, a node may rank the priority for all of its secondary nodes. The corresponding process may be as follows: a first node periodically sends probe requests to all of its secondary nodes; the first node receives a probe response fed back by each of all the secondary nodes, and determines a network delay between the first node and each of all the secondary nodes; the first node determines the priority of each of all the secondary nodes based on the network delay, where the smaller the network delay, the higher the priority of a secondary node.

In one implementation, a first node may periodically send probe requests to all of its pre-recorded secondary nodes. After receiving the probe request, a secondary node may feed back a corresponding probe response to the first node. After that, the first node may receive the probe response fed back by each of all the secondary nodes, and determine the network delay between the first node and each of all the secondary node based on the time of sending the probe request and the time of receiving each probe response. Further, the first node may determine a priority for each secondary node based on the network delay. The smaller the network delay, the higher the priority of a secondary node.

Optionally, the first node may preferentially send an acquisition request to a secondary node with a smaller network delay. Correspondingly, the process of step 202 may be as follows: the first node sequentially selects a candidate node in the plurality of secondary nodes in a descending order of priority; when a traffic scheduling policy of the candidate node is partial traffic-split and the acquisition request for the first data resource does not satisfy the preset criteria for traffic splitting, or when the traffic scheduling policy of the candidate node is no traffic-split, the candidate node may be selected as the target node.

In one implementation, after obtaining the traffic scheduling information of a plurality of secondary nodes, based on the priority of the plurality of secondary nodes, the first node may select a secondary node as a candidate node according to a descending order. If the traffic scheduling policy of the candidate node is no traffic-split, the candidate node may be selected as the target node. If the traffic scheduling policy of the candidate node is partial traffic-split, it may be first determined whether the acquisition request for the first data resource satisfies the preset criteria for traffic splitting. If the acquisition request for the first data resource does not satisfy the preset criteria for traffic splitting, it means that there is no necessity to split the traffic for the acquisition request. The candidate node may then be selected as the target node. If the traffic scheduling policy of the candidate node is partial traffic-split and the acquisition request for the first data resource satisfies the preset criteria for traffic splitting, or the traffic scheduling policy of the candidate node is full traffic-split, it means that there is a necessity to split the traffic for the acquisition request. A next secondary node may be then selected as a candidate node. It should be noted that the foregoing preset criteria for traffic splitting may be arbitrary criteria for traffic splitting preset by the technical staff of the CDN service cluster. The criteria for traffic splitting for different secondary nodes may be the same or different. For example, if a certain percentage of the acquisition request needs to be traffic-split, a random number may be assigned to each acquisition request. If the random number is smaller than the aforementioned percentage, it indicates that the corresponding acquisition request meets the preset criteria for traffic splitting. Further, the domain name of each resource server may also be classified based on the importance. The acquisition request for each level of resource server corresponds to a percentage. For example, there are three levels v1, v2, and v3, and the corresponding percentages of traffic splitting are 100%, 50%, and 0%. Apparently, the foregoing specific percentages may be set by each secondary node in combination with the local traffic load status when generating the traffic scheduling policy.

Optionally, a secondary node may send the traffic scheduling policy to the first node through a probe response or through a request response for a data resource, which may be specifically as follows:

Option 1, the first node updates the locally-stored traffic scheduling policy of each secondary node based on the traffic scheduling policy included in a probe response.

In one implementation, after the first node periodically sends probe requests to all the secondary nodes, each secondary node may add the locally generated latest traffic scheduling policy to the probe response, and feed the probe response back to the first node. In this way, after receiving the probe response, the first node may update the locally-stored traffic scheduling policy of each secondary node based on the traffic scheduling policy included in the probe response.

Option 2, the first node receives a request response for a second data resource sent by a third node. The first node updates the locally-stored traffic scheduling policy of the third node based on the traffic scheduling policy of the third node included in the request response.

Here, the third node may be any of the dynamic parent nodes for providing the back-to-source acceleration service, or any secondary node of any node in the CDN service cluster. The third node may be the same as or different from the second node.

In one implementation, if the first node successfully transmits, through the third node, an acquisition request for a second data resource to a certain resource server, after a certain period, the third node may receive a request response for the second data resource fed back by the resource server. The third node may add the locally generated latest traffic scheduling policy to the request response and send the request response to the first node. In this way, after the first node receives the request response of the second data resource sent by the third node, the locally-stored traffic scheduling policy of the third node may be updated based on the traffic scheduling policy of the third node included in the request response.

Figure 3:
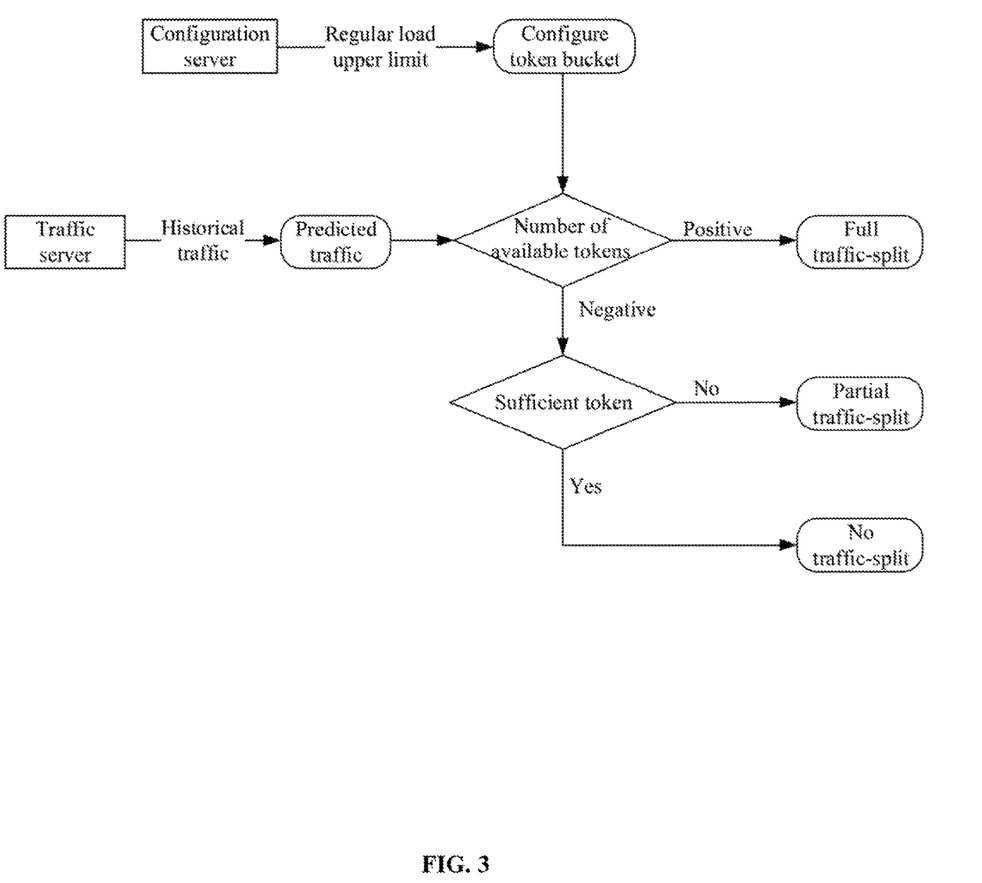
FIG. 3 is a logical diagram of transmitting a data resource acquisition request according to some embodiments of the present disclosure.

For ease of understanding, a simple logical diagram of the processing procedure of the disclosed embodiment is provided in FIG. 3, in which the "historical traffic" refers to the historical total local traffic in the historical cycles, and the "predicted traffic" refers to the predicted latest total local traffic in the current cycle, and the "sufficient token" means that the number of available tokens is not less than the predicted latest total local traffic.

In the disclosed embodiments, when there is a necessity to transmit the acquisition request for the first data resource, the first node obtains locally-stored traffic scheduling policies of a plurality of secondary nodes associated with the resource server to which the first data resource belongs, where the traffic scheduling policies are generated by each of the plurality of secondary nodes based on a local traffic load status; the first node selects a target node among the plurality of secondary nodes based on the traffic scheduling policies of the plurality of secondary nodes; and the first node transmits the acquisition request for the first data resource to the target node. In this way, when transmitting a data resource acquisition request, each node may transmit the aforementioned acquisition request to a secondary node that is not overloaded in traffic based on the traffic scheduling policies of the secondary nodes. This effectively mitigates the reduced back-to-source efficiency of a dynamic parent node caused by the continuous traffic overload, thereby improving the quality of the back-to-source acceleration service in the CDN service cluster.

Based on the similar technical concepts, the present disclosure further provides a system for transmitting a data resource acquisition request. The system comprises a plurality of nodes, where the plurality of nodes includes a first node. The first node is configured to:

when transmitting an acquisition request for a first data resource, obtain locally-stored traffic scheduling policies of a plurality of secondary nodes associated with a resource server to which the first data resource belongs, where the traffic scheduling policies are generated by each of the plurality of secondary nodes based on a local traffic load status;

select a target node among the plurality of secondary nodes based on the traffic scheduling policies of the plurality of secondary nodes; and transmit the acquisition request for the first data resource to the target node.

Optionally, the plurality of nodes further includes a second node. The second node is configured to:

configure an RFC 2697 token bucket algorithm based on a regular load upper limit of local traffic;

periodically obtain historical total local traffic in historical cycles, and predict a latest total local traffic in a current cycle; and determine a traffic scheduling policy of the second node based on the latest total local traffic and execution parameters of the RFC 2697 token bucket algorithm.

Optionally, the second node is specifically configured to:

determine a number of total available tokens of a committed bucket in the current cycle based on a number of current tokens and a token adding rate of the committed bucket and a number of current tokens and a token adding rate of an excess bucket of the RFC 2697 token bucket algorithm;

if the number of total available tokens is negative, determine that the traffic scheduling policy of the second node is full traffic-split;

if the number of total available tokens is positive and less than the latest total local traffic, determine that the traffic scheduling policy of the second node is partial traffic-split; and if the number of total available tokens is positive and not less than the latest total local traffic, determine that the traffic scheduling policy of the second node is no traffic-split.

Optionally, the first node is further configured to:

periodically send a probe request to each of the plurality of secondary nodes;

receive a probe response fed back by each of the plurality of secondary nodes, and determine a network delay between the first node and each of the plurality of secondary nodes; and determine a priority of each of the plurality of secondary nodes based on the network delay, where the smaller the network delay, the higher the priority of a secondary node.

Optionally, the first node is specifically configured to:

select a candidate node among the plurality of secondary nodes in a descending order of priority; and when a traffic scheduling policy of the candidate node is partial traffic-split and the acquisition request for the first data resource does not satisfy preset criteria for traffic splitting, or when the traffic scheduling policy of the candidate node is no traffic-split, determine that the candidate node is the target node.

Optionally, the probe response fed back by each of the plurality of secondary nodes includes a traffic scheduling policy of that secondary node, and the first node is further configured to:

update a locally-stored traffic scheduling policy of each of the plurality of secondary nodes based on the traffic scheduling policy included in the probe response.

Optionally, the plurality of nodes further includes a third node, where the first node is further configured to:

receive a request response for a second data resource sent by a third node; and update a locally-stored traffic scheduling policy of the third node based on a traffic scheduling policy of the third node included in the request response.

In the disclosed embodiments, when there is a necessity to transmit the acquisition request for the first data resource, the first node obtains locally-stored traffic scheduling policies of a plurality of secondary nodes associated with the resource server to which the first data resource belongs, where the traffic scheduling policies are generated by each of the plurality of secondary nodes based on a local traffic load status; the first node selects a target node among the plurality of secondary nodes based on the traffic scheduling policies of the plurality of secondary nodes; and the first node transmits the acquisition request for the first data resource to the target node. In this way, when transmitting a data resource acquisition request, each node may transmit the aforementioned acquisition request to a secondary node that is not overloaded in traffic based on the traffic scheduling policies of the secondary nodes. This effectively mitigates the reduced back-to-source efficiency of a dynamic parent node caused by the continuous traffic overload, thereby improving the quality of the back-to-source acceleration service in the CDN service cluster.

It is clear to those skilled in the art that the entire or partial steps of the disclosed embodiments may be implemented in the form of hardware or may be implemented in the form of software programs that instruct relevant hardware components. The software programs may be stored in a computer-readable storage medium. The storage medium may be a read-only memory, a magnetic disk, or an optic disk, etc.

Although the present disclosure has been described as above with reference to preferred embodiments, these embodiments are not constructed as limiting the present disclosure. Any modifications, equivalent replacements, and improvements made without departing from the spirit and principle of the present disclosure shall fall within the scope of the protection of the present disclosure.

What is claimed is:

1. A method for transmitting a data resource acquisition request, the method comprising:

when transmitting an acquisition request for a first data resource, obtaining, by a first node, traffic scheduling policies of a plurality of secondary nodes associated with a resource server to which the first data resource belongs, wherein the traffic scheduling policies are locally-stored on the first node and the traffic scheduling policies are generated by each of the plurality of secondary nodes based on a local traffic load status of the each of the plurality of secondary nodes;

selecting, by the first node, a target node among the plurality of secondary nodes based on the traffic scheduling policies of the plurality of secondary nodes; and transmitting, by the first node, the acquisition request for the first data resource to the target node;

wherein the traffic scheduling policy is categorized into full traffic-split, partial traffic-split, and no traffic-split.

2. The method according to claim 1, further comprising:

configuring, by a second node, an RFC 2697 token bucket algorithm based on a regular load upper limit of local traffic;

periodically obtaining, by the second node, historical total local traffic in historical cycles, and predicting, by the second node, a latest total local traffic in a current cycle; and determining, by the second node, a traffic scheduling policy of the second node based on the latest total local traffic and execution parameters of the RFC 2697 token bucket algorithm.

3. The method according to claim 2, wherein determining, by the second node, the traffic scheduling policy of the second node based on the latest total local traffic and the execution parameters of the RFC 2697 token bucket algorithm includes:

determining, by the second node, a number of total available tokens of a committed bucket in the current cycle based on a number of current tokens and a token adding rate of the committed bucket and a number of current tokens and a token adding rate of an excess bucket of the RFC 2697 token bucket algorithm;

when the number of total available tokens is negative, determining, by the second node, that the traffic scheduling policy of the second node is full traffic-split;

when the number of total available tokens is positive and less than the latest total local traffic, determining, by the second node, that the traffic scheduling policy of the second node is partial traffic-split; and when the number of total available tokens is positive and not less than the latest total local traffic, determining, by the second node, that the traffic scheduling policy of the second node is no traffic-split.

4. The method according to claim 1, further comprising:

periodically sending, by the first node, a probe request to each of the plurality of secondary nodes;

receiving, by the first node, a probe response fed back by each of the plurality of secondary nodes, and determining, by the first node, a network delay between the first node and each of the plurality of secondary nodes; and determining, by the first node, a priority of each of the plurality of secondary nodes based on the network delay, wherein the smaller the network delay, the higher the priority of a secondary node.

5. The method according to claim 4, wherein selecting, by the first node, the target node among the plurality of secondary nodes based on the traffic scheduling policies of the plurality of secondary nodes includes:

sequentially selecting, by the first node, a candidate node among the plurality of secondary nodes in a descending order of priority; and when a traffic scheduling policy of the candidate node is partial traffic-split and the acquisition request for the first data resource does not satisfy preset criteria for traffic splitting, or when the traffic scheduling policy of the candidate node is no traffic-split, determining, by the first node, that the candidate node is the target node.

6. The method according to claim 4, wherein the probe response fed back by each of the plurality of secondary nodes includes a traffic scheduling policy of that secondary node, and after receiving, by the first node, the probe response fed back by each of the plurality of secondary nodes, the method further includes:

updating, by the first node, the traffic scheduling policy of each of the plurality of secondary nodes based on the traffic scheduling policy included in the probe response, wherein the traffic scheduling policy of each of the plurality of secondary nodes is locally stored in the first node.

7. The method according to claim 1, further comprising:

sending, by the first node, an acquisition request for a second data resource to a certain resource server to which the second data resource belongs, via a third node;

receiving, by the first node, a request response for the second data resource sent by a third node; and updating, by the first node, a locally-stored traffic scheduling policy of the third node based on a traffic scheduling policy of the third node included in the request response.

8. A system for transmitting a data resource acquisition request, the system comprising a plurality of nodes, wherein the plurality of nodes includes a first node that is configured to:

when transmitting an acquisition request for a first data resource, obtain traffic scheduling policies of a plurality of secondary nodes associated with a resource server to which the first data resource belongs, wherein the traffic scheduling policies are locally-stored on the first node and the traffic scheduling policies are generated by each of the plurality of secondary nodes based on a local traffic load status of the each of the plurality of secondary nodes;

select a target node among the plurality of secondary nodes based on the traffic scheduling policies of the plurality of secondary nodes; and transmit the acquisition request for the first data resource to the target node;

wherein the traffic scheduling policy is categorized into full traffic-split, partial traffic-split, and no traffic-split.

9. The system according to claim 8, wherein the plurality of nodes further includes a second node that is configured to:

configure an RFC 2697 token bucket algorithm based on a regular load upper limit of local traffic;

periodically obtain historical total local traffic in historical cycles, and predict a latest total local traffic in a current cycle; and determine a traffic scheduling policy of the second node based on the latest total local traffic and execution parameters of the RFC 2697 token bucket algorithm.

10. The system according to claim 9, wherein the second node is specifically configured to:

determine a number of total available tokens of a committed bucket in the current cycle based on a number of current tokens and a token adding rate of the committed bucket and a number of current tokens and a token adding rate of an excess bucket of the RFC 2697 token bucket algorithm;

when the number of total available tokens is negative, determine that the traffic scheduling policy of the second node is full traffic-split;

when the number of total available tokens is positive and less than the latest total local traffic, determine that the traffic scheduling policy of the second node is partial traffic-split; and when the number of total available tokens is positive and not less than the latest total local traffic, determine that the traffic scheduling policy of the second node is no traffic-split.

11. The system according to claim 8, wherein the first node is further configured to:

periodically send a probe request to each of the plurality of secondary nodes;

receive a probe response fed back by each of the plurality of secondary nodes, and determine a network delay between the first node and each of the plurality of secondary nodes; and determine a priority of each of the plurality of secondary nodes based on the network delay, wherein the smaller the network delay, the higher the priority of a secondary node.

12. The system according to claim 11, wherein the first node is specifically configured to:

select a candidate node among the plurality of secondary nodes in a descending order of priority; and when a traffic scheduling policy of the candidate node is partial traffic-split and the acquisition request for the first data resource does not satisfy preset criteria for traffic splitting, or when the traffic scheduling policy of the candidate node is no traffic-split, determine that the candidate node is the target node.

13. The system according to claim 11, wherein the probe response fed back by each of the plurality of secondary nodes includes a traffic scheduling policy of that secondary node, and the first node is further configured to:

update the traffic scheduling policy of each of the plurality of secondary nodes based on the traffic scheduling policy included in the probe response, wherein the traffic scheduling policy of each of the plurality of secondary nodes is locally stored in the first node.

14. The system according to claim 8, wherein the plurality of nodes further includes a third node, and the first node is further configured to:

sending, by the first node, an acquisition request for a second data resource to a certain resource server to which the second data resource belongs, via a third node;

receive a request response for the second data resource sent by a third node; and update a locally-stored traffic scheduling policy of the third node based on a traffic scheduling policy of the third node included in the request response.

* * * * *